(12) United States Patent
DePuy

(10) Patent No.: US 9,416,328 B2
(45) Date of Patent: Aug. 16, 2016

(54) SYSTEM AND METHOD FOR TREATMENT OF FINE PARTICULATES SEPARATED FROM SYNGAS PRODUCED BY GASIFIER

(71) Applicant: General Electric Company, Schenectady, NY (US)

(72) Inventor: Richard Anthony DePuy, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 612 days.

(21) Appl. No.: 13/749,677

(22) Filed: Jan. 24, 2013

(65) Prior Publication Data
US 2013/0133305 A1 May 30, 2013

Related U.S. Application Data

(63) Continuation-in-part of application No. 12/683,413, filed on Jan. 6, 2010, now abandoned.

(51) Int. Cl.
C01B 7/00 (2006.01)
C10K 1/00 (2006.01)
C10J 3/72 (2006.01)
F02G 3/00 (2006.01)
C10J 3/00 (2006.01)
(Continued)

(52) U.S. Cl.
CPC ... *C10K 1/00* (2013.01); *C10J 3/00* (2013.01); *C10J 3/721* (2013.01); *C10J 3/84* (2013.01); *C10J 3/86* (2013.01); *C10K 1/002* (2013.01); *C10K 1/003* (2013.01); *C10K 1/004* (2013.01); *C10K 1/005* (2013.01); *C10K 1/006* (2013.01); *C10K 1/02* (2013.01); *C10K 1/08* (2013.01); *C10K 3/001* (2013.01); *F02G 3/00* (2013.01); *C10J 2300/0959* (2013.01); *C10J 2300/0973* (2013.01); *C10J 2300/165* (2013.01); *C10J 2300/169* (2013.01); *C10J 2300/1653* (2013.01); *C10J 2300/1678* (2013.01); *Y02E 20/16* (2013.01); *Y02E 20/18* (2013.01)

(58) Field of Classification Search
CPC ............ C10J 2300/1238; C03B 5/025; C01B 2203/0861; F23G 2204/201
See application file for complete search history.

(56) References Cited

U.S. PATENT DOCUMENTS 4,718,362 A  1/1988  Santen et al.
5,280,757 A  1/1994  Carter et al.
(Continued)

FOREIGN PATENT DOCUMENTS

WO  2006081661       8/2006
WO  2008104058 A1   9/2008
(Continued)

OTHER PUBLICATIONS

Search Report Issued in Connection with Corresponding WO Patent Application No. US10/59170 Filed on Dec. 7, 2010.

*Primary Examiner* — Imran Akram
(74) *Attorney, Agent, or Firm* — Fletcher Yoder, P.C.

(57) ABSTRACT

A system includes a gasifier having a first enclosure having a first inlet, a first outlet, and a first interior volume. The first inlet is configured to receive a first fuel feedstock into the first interior volume, and the first outlet is configured to output a first syngas away from the first interior volume. The system also includes a plasma gasifier disposed downstream from the first outlet and coupled to a waste stream produced by the gasifier from the first fuel feedstock.

9 Claims, 10 Drawing Sheets

(51) Int. Cl.
*C10J 3/84* (2006.01)
*C10K 1/02* (2006.01)
*C10J 3/86* (2006.01)
*C10K 1/08* (2006.01)
*C10K 3/00* (2006.01)

(56) References Cited

U.S. PATENT DOCUMENTS

| | | |
|---|---|---|
| 5,311,830 A | 5/1994 | Kiss |
| 5,711,017 A | 1/1998 | Bilter et al. |
| 5,809,911 A | 9/1998 | Feizollahi |
| 5,958,264 A | 9/1999 | Tsantrizos et al. |
| 6,160,238 A | 12/2000 | Titus et al. |
| 6,810,821 B2 | 11/2004 | Chan |
| 6,971,323 B2 | 12/2005 | Capote et al. |
| 6,987,792 B2 | 1/2006 | Do et al. |
| 7,216,593 B2 | 5/2007 | Capote et al. |
| 7,249,564 B2 | 7/2007 | Lissianski et al. |
| 7,752,983 B2 | 7/2010 | Vera |
| 8,199,790 B2 | 6/2012 | Vera |
| 2007/0261303 A1 | 11/2007 | Surma et al. |
| 2007/0289216 A1 | 12/2007 | Tsangaris et al. |
| 2008/0041829 A1 | 2/2008 | Blutke et al. |
| 2008/0202028 A1 | 8/2008 | Tsangaris et al. |
| 2008/0222956 A1 | 9/2008 | Tsangaris et al. |
| 2009/0064581 A1 | 3/2009 | Nielsen et al. |
| 2010/0139534 A1 | 6/2010 | Tsantrizos |
| 2011/0162275 A1* | 7/2011 | Hladun .............. C10J 3/00 48/61 |
| 2011/0162278 A1 | 7/2011 | DePuy et al. |
| 2012/0021218 A1 | 1/2012 | Lee et al. |
| 2012/0061618 A1 | 3/2012 | Santoianni et al. |

FOREIGN PATENT DOCUMENTS

| | | |
|---|---|---|
| WO | 2008104088 A1 | 9/2008 |
| WO | 2009002191 A2 | 12/2008 |
| WO | 2009155697 A1 | 12/2009 |

* cited by examiner

SYSTEM AND METHOD FOR TREATMENT OF FINE PARTICULATES SEPARATED FROM SYNGAS PRODUCED BY GASIFIER

CROSS-REFERENCE TO RELATED APPLICATIONS

This application is a continuation in part of U.S. patent application Ser. No. 12/683,413, entitled "System for Removing Fine Particulates From Syngas Produced by Gasifier", filed Jan. 6, 2010, which is herein incorporated by reference in its entirety.

BACKGROUND OF THE INVENTION

The subject matter disclosed herein relates to gasification systems, and, more particularly, to improved particulate removal systems and methods.

Integrated gasification combined cycle (IGCC) power plants are capable of generating energy from various carbonaceous feedstock, such as coal or natural gas, relatively cleanly and efficiently. IGCC technology may convert the carbonaceous feedstock into a gas mixture of carbon monoxide (CO) and hydrogen ($H_2$), i.e., syngas, by reaction with oxygen and steam in a gasifier. Such power plants typically clean and process the gases for use as fuel in downstream applications. However, the gas mixture generated by the gasifier typically contains a significant amount of particulates that may include inorganic contaminants and unconverted organic materials. Unfortunately, these particulates must typically be scrubbed out with water, filtered out with ceramic filters, eliminated using cyclones, or removed via another method before the syngas may be utilized. Furthermore, unreacted carbonaceous particulates that are discarded may decrease the carbon conversion efficiency of such gasification systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasifier having a first enclosure having a first inlet, a first outlet, and a first interior volume. The first inlet may receive a first fuel feedstock into the first interior volume, and the first outlet may output a first syngas away from the first interior volume. The system also includes a plasma gasifier disposed downstream from the first outlet and coupled to a waste stream produced by the gasifier from the first fuel feedstock.

In a second embodiment, a method including, gasifying a first fuel feedstock in a gasifier to produce a first syngas and a waste stream, filtering the waste stream to produce a second fuel feedstock, and treating the second fuel feedstock in a plasma gasifier to produce a second syngas.

In a third embodiment, a system includes instructions disposed on a non-transitory, machine readable medium. The instructions are configured to gasify a first fuel feedstock in a gasifier to produce a first syngas and a waste stream, filter the waste stream to produce a second fuel feedstock, and treat the second fuel feedstock in a plasma gasifier to produce a second syngas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
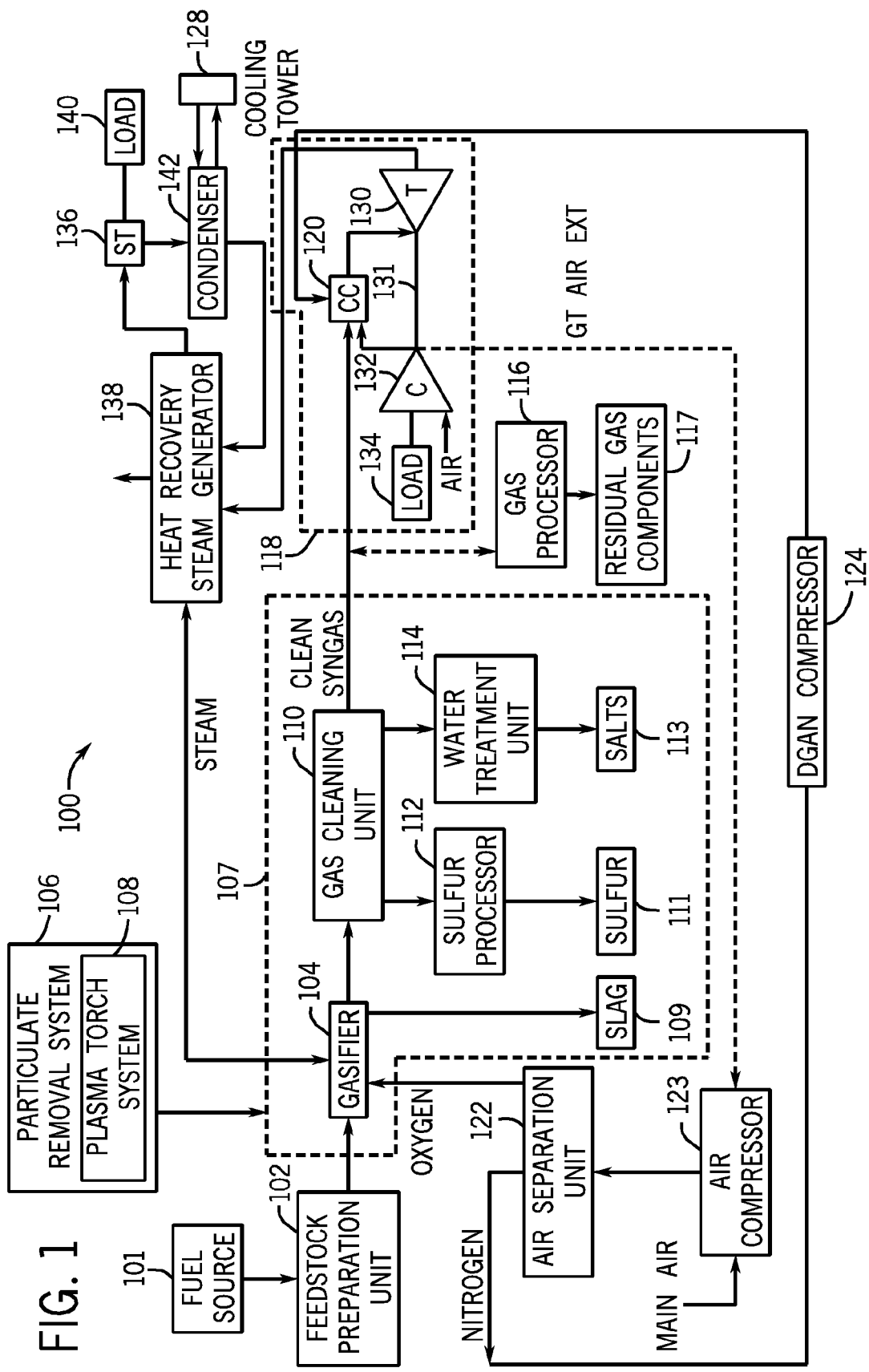
FIG. 1 is a block diagram of an embodiment of an integrated gasification combined cycle (IGCC) power plant having a particulate removal system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed below, embodiments of a particulate removal system utilize focused energy (e.g., plasma energy) to treat a resultant fluid stream from a gasifier. As used herein, focused energy is at least greater than approximately 5 MJ/m³. For example, the focused energy may be between approximately 10 MJ/m³ to 70 MJ/m³. For further example, in one embodiment, the plasma may have an energy density of approximately 50 MJ/m³. Focused energy systems described herein may include one or more focused energy devices capable of generating and directing one or more focused energy beams or sheets. For example, the particulate removal system may include a plasma torch system configured to direct one or more plasma streams originating from one or more plasma torches on the fluid flow. In this way, the focused energy systems (e.g., plasma torches) may cause changes in the fluid composition, for example, by causing inorganic particulate to melt and organic particulate to react. Accordingly, the plasma torches may be capable of maintaining internal temperatures of up to approximately 5000° C. as inert gas is passed through the torch. For example, internal temperatures in the plasma torches may be at least greater than approximately 2000° C., 3000° C., 4000° C., or 5000° C. As used herein, plasma may be defined as any partially ionized gas capable of reaching temperatures sufficient to melt inorganic particulate and/or react organic particulate. Furthermore, a plasma torch, as used herein, may be defined as any device capable of generating a directed flow of plasma through its nozzle. The foregoing features of the particulate removal system may facilitate increased carbon conversion efficiency in associated gasification systems since organic particulate that remains unreacted after non-plasma based gasification in a gasifier may still be reacted in the particulate removal system. Therefore, the unique particulate removal system described herein may allow gasification systems to generate the maximum amount of useful syngas from a feedstock supply. Furthermore, the particulate removal system may facilitate easier separation of the useful syngas from its contaminants because of the high density of the inorganic byproducts.

In certain embodiments, the particulate removal system may include a plasma gasifier having one or more focused energy sources (e.g., plasma torches) disposed within a plasma gasification chamber. The plasma torches may direct plasma streams toward fluid flow through the plasma gasification chamber. For example, the plasma gasifier may include an enclosure having one or more plasma torches coupled to the enclosure. In such embodiments, the plasma torches may be directed towards one another to generally converge plasma streams. Furthermore, one or more of the plasma torches may be positioned to direct one or more plasma streams in an upstream direction opposite a downstream direction of fluid flow. In other embodiments, the plasma torch system may be disposed within a lower region (e.g., downstream region) of a non-plasma based gasifier. For instance, the plasma torches may be located in a region adjacent to a first outlet of the gasifier that is at least less than approximately 30 percent of the interior volume of the gasifier. For further example, the particulate removal system may be coupled to an outlet of a syngas cooler, downstream of a gas cleaning unit, downstream or associated with a water treatment system, or any other suitable location in a gasification system.

Figure 10:
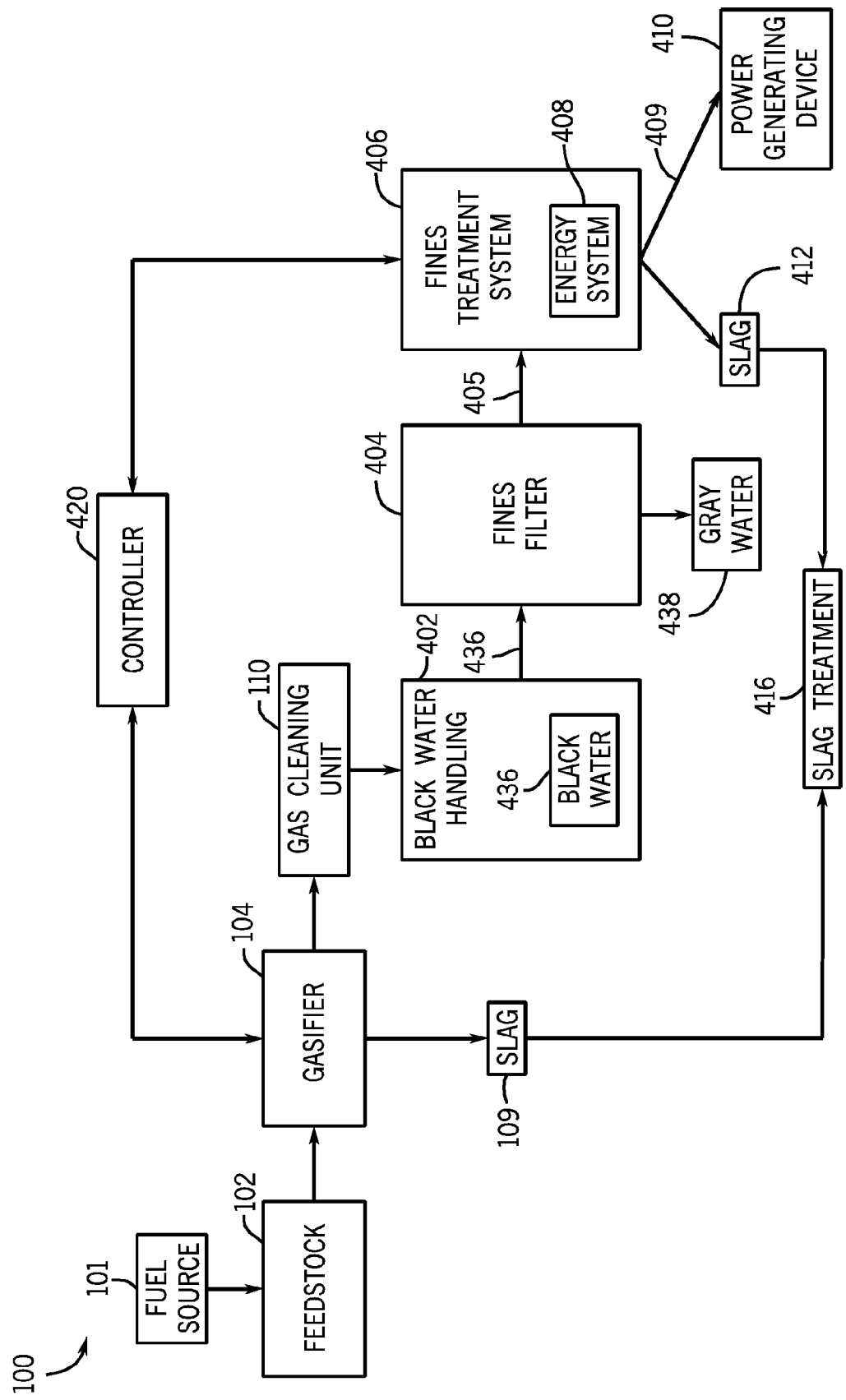
FIG. 10 is a block diagram of an embodiment of an integrated gasification combined cycle (IGCC) power plant having a fines treatment system.
Figure 11:
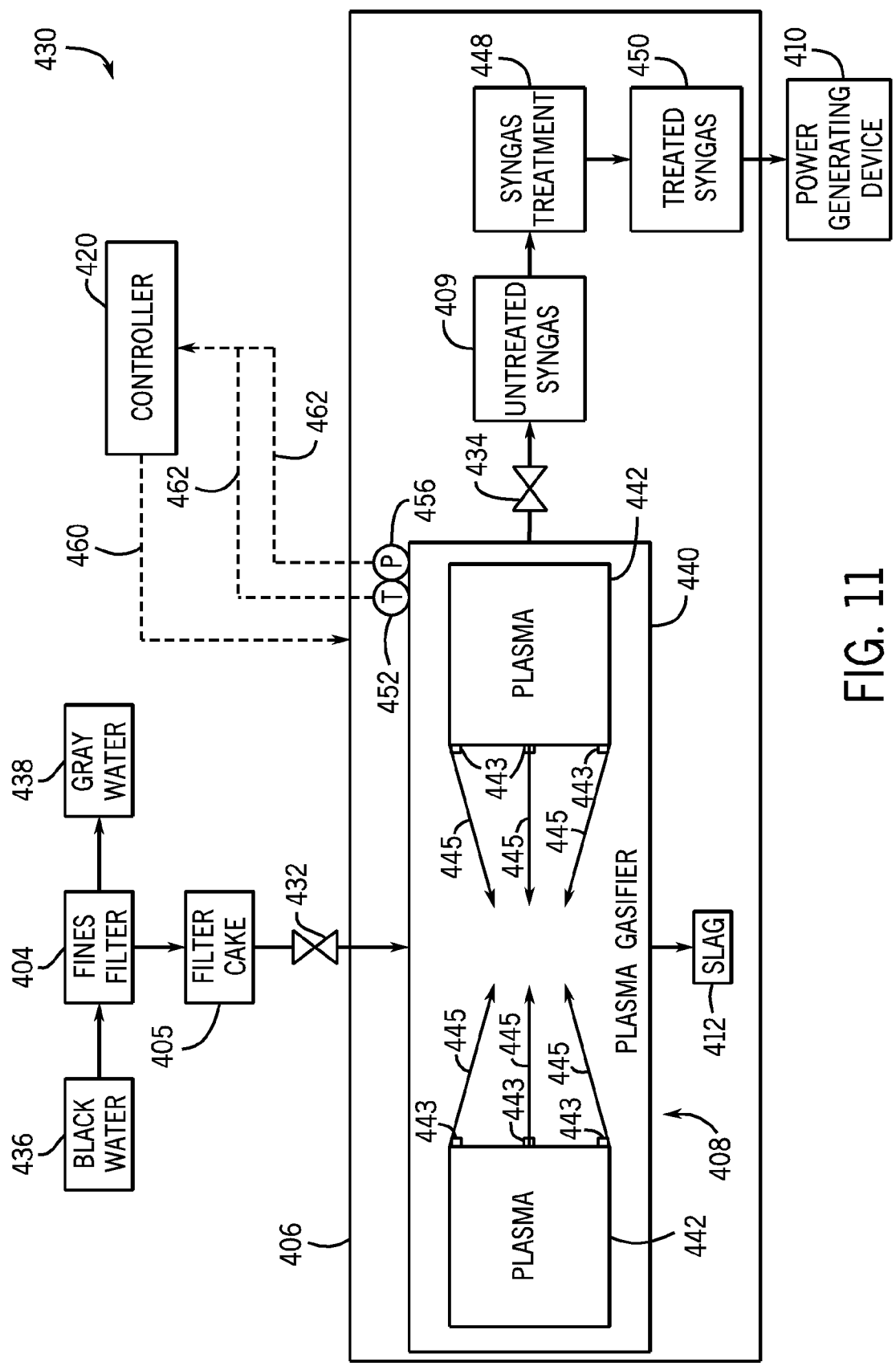
FIG. 11 is a block diagram of an embodiment of a gasification system as illustrated in FIG. 10, including a fines treatment system including a plasma torch system.

In certain embodiments, as discussed below with respect to FIGS. 10 and 11, a fines treatment system may utilize the plasma gasifier, as discussed above, to treat a resultant waste stream generated by the non-plasma gasifier from a first fuel feedstock to produce a second syngas. Accordingly, the carbon conversion efficiency of the gasification system may increase and disposal and recycling of the waste stream may be eliminated or reduced as there may no longer be a need to transport it back to the non-plasma gasifier. Furthermore, the fines treatment system may allow a plant operator to run a plant in a mode where the carbon conversion is less in the non-plasma gasifier, for example in an oxygen restrained environment, because the fines treatment system has the capacity to convert any unreacted carbon from the non-plasma gasifier to produce the syngas. Thus, the overall carbon conversion of the plant may be maintained at a desirable level.

FIG. 1 is a diagram of an embodiment of an integrated gasification combined cycle (IGCC) system 100 that may produce and burn a synthetic gas, i.e., syngas. Elements of the IGCC system 100 may include a fuel source 101, such as a solid feed, that may be utilized as a source of energy for the IGCC. The fuel source 101 may include coal, petroleum coke, biomass, wood-based materials, agricultural wastes, tars, coke oven gas and asphalt, or other carbon containing items. Although embodiments of the particulate removal system are illustrated throughout in the context of the IGCC system 100, the particulate removal system disclosed herein may be used in any of a variety of types of plants that use or produce syngas. For example, the particulate removal system may be used in any plant that produces CO, hydrogen, methanol, ammonia, or any other chemical or fuel product. That is, the particulate removal system described herein may be used with plants other than an IGCC plant. Furthermore, the particulate removal system may be used without power generation (e.g., generators) in some embodiments.

The solid fuel of the fuel source 101 may be passed to a feedstock preparation unit 102. The feedstock preparation unit 102 may, for example, resize or reshape the fuel source 101 by chopping, milling, shredding, pulverizing, briquetting, or pelletizing the fuel source 101 to generate feedstock. Additionally, water, or other suitable liquids may be added to the fuel source 101 in the feedstock preparation unit 102 to create slurry feedstock. In other embodiments, no liquid is added to the fuel source, thus yielding dry feedstock.

The feedstock may be passed to a gasifier 104 from the feedstock preparation unit 102. The gasifier 104 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700° C. to 1600° C., depending on the type of gasifier 104 utilized. The gasification process may include the feedstock undergoing a pyrolysis process, whereby the feedstock is heated. Temperatures inside the gasifier 104 may range from approximately 150° C. to 700° C. during the pyrolysis process, depending on the fuel source 101 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 104. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700° C. to 1600° C. Next, steam may be introduced into the gasifier 104 during a gasification step. The char may react with the carbon dioxide and steam to produce carbon monoxide and hydrogen at temperatures ranging from approximately 800° C. to 1100° C. In essence, the gasifier utilizes steam and oxygen to allow some of the feedstock to be "burned" to produce carbon monoxide and release energy, which drives a second reaction that converts further feedstock to hydrogen and additional carbon dioxide.

In this way, a resultant gas is manufactured by the gasifier 104. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed dirty syngas or untreated syngas, since it contains, for example, $H_2S$. The gasifier 104 may also generate waste, such as slag 109, which may be a wet inorganic material. This slag 109 may be removed from the gasifier 104 and disposed of, for example, as road base or as another building material.

A particulate removal system 106 may be coupled to one or more components of the IGCC system 100, such as within region 107 having the gasifier 104 and gas cleaning unit 110. For example, the particulate removal system 106 may be coupled to a downstream portion of the gasifier 104 or downstream from an outlet of the gasifier 104. By further example, the particulate removal system 106 may be coupled to a syngas cooler, the gas cleaning unit 110, the water treatment unit, or any other component in the IGCC system 100. In other words, the particulate removal system 106 is disposed downstream from a primary gasification zone (e.g., non-plasma gasification) of the gasifier 104. The particulate removal system 106 includes a focused energy system, such as a plasma torch system 108. The focused energy system (e.g., plasma torch system 108) may provide a focused beam of high energy, such as a beam with an energy density of approximately 50 $MJ/m^3$. The plasma torch system 108 may include one or more plasma torches configured to remove particulate matter from a fluid (e.g., untreated syngas) downstream of the primary gasification zone of the gasifier 104. That is, the plasma torch system 108 is configured to melt inorganic particulate and react organic particulate in the resultant gas that is manufactured by the gasifier 104. In certain embodiments, the inorganic particulate and the organic particulate may have an average particle diameter of less than approximately 80 mm. For example, the particulate may have an average particle diameter of between approximately 500 microns to 100 mm. The one or more plasma torches may be any torches capable of generating plasma suitable for the gasification process. For example, the plasma torches may include two electrodes capable of receiving electricity and generating an arc. The plasma torches may be capable of maintaining internal temperatures of up to approximately 5000° C. as inert gas is passed through the arc. For example, internal temperatures in the plasma torches may be at least greater than approximately 2000° C., 3000° C., 4000° C., or 5000° C. The foregoing components may facilitate increased carbon conversion efficiency in the IGCC system 100, since organic particulate that remains unreacted after gasification in the gasifier 104 may still be reacted in the particulate removal system 106. This may enable the IGCC system 100 to maximize the amount of useful syngas generated from the feedstock. Furthermore, such systems 106 and 108 may lead to more dense inorganic byproducts as compared to traditional systems, thereby facilitating easier separation of the useful syngas from its contaminants.

The gas cleaning unit 110 is configured to clean the untreated syngas from the gasifier 104. The gas cleaning unit 110 may scrub the untreated syngas to remove the HCl, HF, COS, HCN, and $H_2S$ from the untreated syngas, which may include separation of sulfur 111 in a sulfur processor 112 by, for example, an acid gas removal process in the sulfur processor 112. Furthermore, the gas cleaning unit 110 may separate salts 113 from the untreated syngas via a water treatment unit 114 that may utilize water purification techniques to generate usable salts 113 from the untreated syngas. In certain embodiments, the water treatment unit 114 includes the particulate removal system 106 and/or the plasma torch system 108. Subsequently, the gas from the gas cleaning unit 110 may include clean syngas or treated syngas, (e.g., the sulfur 111 has been removed from the syngas), with trace amounts of other chemicals, e.g., $NH_3$ (ammonia) and $CH_4$ (methane).

A gas processor 116 may be utilized to remove residual gas components 117 from the treated syngas such as, ammonia and methane, as well as methanol or any residual chemicals. However, removal of residual gas components 117 from the treated syngas is optional, since the treated syngas may be utilized as a fuel even when containing the residual gas components 117, e.g., tail gas. At this point, the treated syngas may include approximately 40% CO, approximately 55% $H_2$, and approximately 3% $CO_2$ and is substantially stripped of $H_2S$. This treated syngas may be transmitted to a combustor 120, e.g., a combustion chamber, of a gas turbine engine 118 as combustible fuel. Furthermore, the $CO_2$ may be removed from the treated syngas prior to transmission to the gas turbine engine.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 104. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 104. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
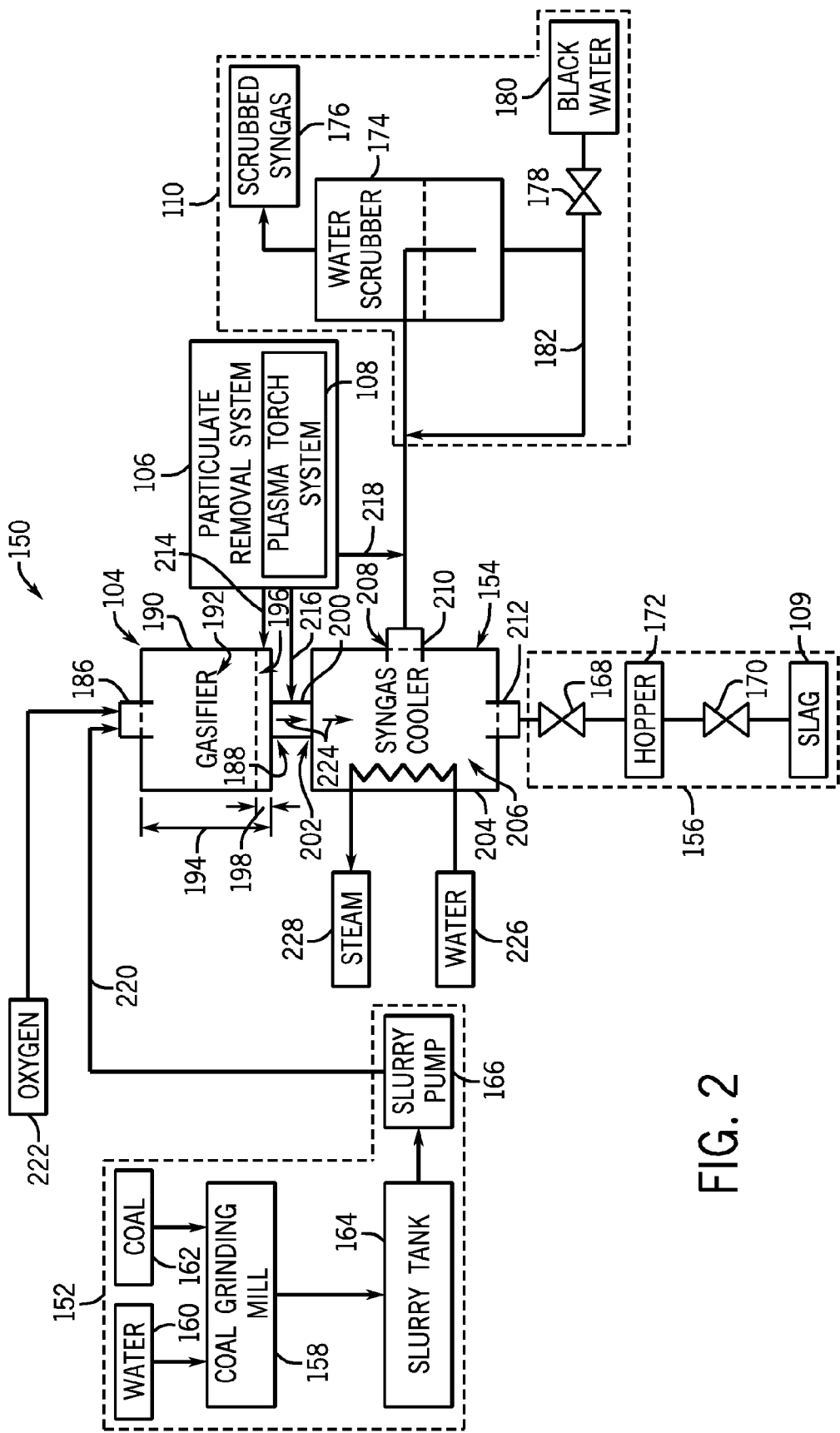
FIG. 2 is a block diagram of an embodiment of a gasification system as illustrated in FIG. 1, including a particulate removal system including a plasma torch system.

FIG. 2 is a block diagram of an embodiment of a gasification system or process 150, including the unique particulate removal system 106 having a focused energy system (e.g., the plasma torch system 108). The gasification system 150 may employ a partial oxidation gasification process (e.g., Texaco Gasification Process (TGP)) for generating synthetic gas from liquid hydrocarbons, petroleum residues, coke, or a combination thereof. However, the particulate removal system 106 may be used with a variety of other types of gasification processes. For instance, the particulate removal system 106 may be suitable for use with the Shell Coal Gasification Process (SCGP), the ConocoPhillips E-Gas Gasification Process, and the Mitsubishi Heavy Industries (MHI) Dry-Feed Gasification Process, among others.

The illustrated gasification system 150 includes a feedstock preparation system or process 152, the gasifier 104, a syngas cooler 154, a fines or slag removal system or process 156, the particulate removal system 106, and the gas cleaning unit 110. The illustrated feedstock preparation system 152 includes a coal grinding mill 158 configured to receive water 160 and coal 162, a slurry tank 164, and a slurry pump 166. The fines or slag removal system 156 includes valves 168 and 170 and one or more lock hoppers 172 to collect and/or transport the slag 109. The gas cleaning unit 110 includes a water scrubber 174 that generates scrubbed syngas 176, a valve 178, black water 180, and a recirculation loop 182.

The gasifier 104 includes a first inlet 186, a first outlet 188, and an enclosure 190. The enclosure 190 defines a first interior volume 192 (e.g., upstream portion) that may serve as a primary gasification chamber during operation. A distance 194 defines the height of the first interior volume 192. A lower region 196 (e.g., downstream portion) of the gasifier 104 is adjacent to the first outlet 188 and is defined by a height 198. The lower region 196 of the gasifier 104 may be at least less than approximately 5%, 10%, 15%, 20%, 25%, 30%, 35%, 40%, or 45% of the first interior volume 192 or the entire volume of the gasifier 104. A first conduit 200 couples the first outlet 188 of the gasifier 104 to a second inlet 202 of the syngas cooler 154. An enclosure 204 defines a second interior volume 206 of the syngas cooler 154. A second outlet 208 couples the syngas cooler 154 to a second conduit 210. A third outlet 212 couples the syngas cooler 154 to the fines or slag removal system 156.

In the illustrated embodiment, the gasifier 104 is an entrained flow gasifier suitable for use in a TGP. That is, during gasification, the operating temperature of the gasifier 104 may be approximately 1200° C. to 1500° C. and the operating pressure may be less than approximately 27 to 80 bar. Accordingly, the gasifier 104 may include a refractory lining that acts as a passive thermal shield during operation. Such a refractory lining may be made of a variety of refractory materials capable of withstanding temperatures up to or greater than approximately 500° C., 1000° C., 1500° C., or even 2000° C. That is, the refractory lining may be made of any material that maintains its predetermined physical and chemical characteristics upon exposure to such high temperatures. Suitable refractory materials for use in the gasifier 104 may include ceramics (e.g., clay or minerals), metals (e.g., titanium, tungsten), cermets (i.e., ceramic and metal composites), or other refractory materials (e.g., silica, aluminum oxide).

In the embodiments of the gasification system 150 illustrated and described herein, the gasifier 104 is an entrained flow gasifier wherein the resultant syngas exits the gasifier 104 via the first outlet 188 located at the bottom of the gasifier 104. However, it should be noted that the unique particulate removal system 106 disclosed herein may be used with a variety of other gasification processes that include gasifiers, wherein the outlet is not disposed in a bottom portion of the gasifier. For example, the disclosed embodiments may be used in conjunction with fixed bed gasifiers or fluidized bed gasifiers. In such embodiments, the direction of flow through the gasifier may be upward such that the resultant syngas may exit via an outlet located on or near a top portion of the gasifier. For further example, the particulate removal system 106 may be used with other entrained flow gasifiers, wherein the flow is established in a generally upward direction through the gasifier.

The particulate removal system 106 includes the plasma torch system 108. The particulate removal system 106 of FIG. 2 may be located in a variety of positions within the gasification system 150. For example, the particulate removal system 106 may be located in the lower region 196 (e.g., downstream portion) of the gasifier 104 adjacent the first outlet 188, as indicated by arrow 214. In such embodiments, the plasma torch system 108 may include a plurality of plasma torches disposed about the circumference of the lower region 196 or a single plasma torch disposed in the lower region 196. In other words, the particulate removal system 106 may be located within the non-plasma based gasifier 104 downstream from a primary gasification zone (e.g., non-plasma based gasification). For further example, the particulate removal system 106 may be coupled to the first conduit 200 between the first outlet 188 of the gasifier 104 and the second inlet 202 of the syngas cooler 154, as indicated by arrow 216. In such embodiments, one or more plasma torches included in the plasma torch system 108 may be located in or on the first conduit 200. For instance, a plurality of plasma torches may be located along the walls of the first conduit 200. The plasma torches may be arranged in any manner suitable for the melting of inorganic particulate and reacting of organic particulate in the syngas. For instance, the plasma torches may be directed towards one another such that a plurality of plasma streams emerging from the plasma torches converge at a predetermined point. In still further embodiments, the particulate removal system 106 may be located in any suitable place downstream of the syngas cooler 154, as indicated by arrow 218. For example, the plasma torch system 108 may be coupled to the second conduit 210 coupled to the second outlet 208 of the syngas cooler 154. For further example, the plasma torch system 108 may be coupled directly to the syngas cooler 154.

During operation, the feedstock preparation system 152 prepares a slurry feed of coal that is approximately 50 to 70 wt % in water. Specifically, the water 160 and the coal 162 are input into the coal grinding mill 158. The coal grinding mill 158 breaks down the coal 162 into smaller particles and mixes the particles with the water 160 to form the slurry feed of coal in water. The slurry feed is then transferred to the slurry tank 164 for storage prior to use. The slurry pump 166 accesses the slurry feed in the slurry tank 164 and transfers an amount suitable for use in the gasification process 150 to the gasifier 104 via conduit 220. Accordingly, the slurry pump 166 may operate in a continuous mode (i.e., the slurry pump 166 supplies a set amount of slurry feed per minute), a stepwise mode (i.e., the slurry pump 166 supplies a predetermined incremental amount at specific time intervals), or any other suitable mode. Furthermore, in certain embodiments, the slurry pump 166 may receive feedback from one or more sensors located in or downstream from the gasifier 104 and adjust the amount of pumped slurry feed in response to such feedback. The illustrated embodiment includes a slurry feed system in which the feedstock preparation system 152 prepares a slurry feed of coal. However, in other embodiments, the feedstock preparation system 152 may be a dry feed system configured to prepare a dry feed. That is, in some embodiments, a dry feed system may be used rather than a slurry feed system.

The slurry feed and oxygen 222 are supplied to the gasifier 104 via the first inlet 186 located in a top of the gasifier 104. Reactants and slag flow in a generally downstream direction from the first inlet 186 of the gasifier 104 to the first outlet 188 of the gasifier 104. That is, flow of the slurry feed and the gasifying agent (e.g., oxygen) occur concurrently through the gasifier 104. Furthermore, such flow through the gasifier 104 may have a residence time of less than approximately 3, 4, 5, or 6 seconds. During gasification, the operating temperature of the illustrated entrained bed gasifier 104 may be approximately 1200° C. to 2000° C., and the operating pressure may be less than approximately 80 bar. The illustrated entrained flow gasifier 104 utilizes steam and oxygen to allow some of the slurry feed to be burned to produce carbon monoxide and release energy. These products drive a second reaction that converts further feedstock to hydrogen and additional carbon dioxide. These reactions occur without any focused energy system, such as a plasma torch system, and thus may be described as a non-plasma gasification mechanism. In other words, the reactions with oxygen and steam generally raise the temperature of the entire volume of the gasifier 104, rather than relying on a focused energy source (e.g., plasma torch). Thus, a resultant gas is manufactured by the gasifier 104 without the use of focused energy systems, such as plasma torches. The resultant gas may include approximately 85% of carbon monoxide and hydrogen in equal proportions, as well as $CH_4$, HCl, HF, COS, $NH_3$, HCN, and $H_2S$ (based on the sulfur content of the feedstock), but may not include tars, condensable hydrocarbons, phenols, and ammonia. During the non-plasma gasification mechanism, the gasifier 104 may also generate waste, such as molten fines or slag 109.

The syngas and slag generated in the gasifier 104 may generally flow in a downward manner (e.g., downstream direction) from the first outlet 188 of the gasifier 104, through the first conduit 200, and into the syngas cooler 154 via the second inlet 202. In certain embodiments, the resultant syngas/slag mixture may be acted on by components of the particulate removal system 106 prior to entering the syngas cooler 154. That is, the plasma torch system 108 may be disposed in the lower region 196 (e.g., downstream portion) of the gasifier 104 and/or coupled to the first conduit 200. In such embodiments, the plasma torch system 108 may include one or more plasma torches configured to remove particulate matter from the fluid downstream of the primary gasification zone of the gasifier 104. The plasma torches may melt inorganic particulate and react organic particulate in the resultant gas product that is manufactured by the gasifier 104. That is, the particulate removal system 106 may act on the product of the non-plasma based gasification mechanism that occurs in the gasifier 104. Accordingly, the particulate removal system 106 is configured to exclusively treat the fines that emerge as products of the primary gasification process. As such, the foregoing features may facilitate increased carbon conversion efficiency as compared to systems without the novel particulate removal system 106. For instance, organic particulate that remains unreacted after the non-plasma based gasification mechanism in the gasifier 104 may still be reacted further downstream via the plasma torch system 108.

After entering the syngas cooler 154, the resultant fluid (e.g., syngas and slag mixture) flows through a gas passage of the syngas cooler 154 that extends in a flow direction 224 lengthwise through the second interior volume 206. Accordingly, the resultant fluid enters the syngas cooler 154 through the second inlet 202 and flows lengthwise through the syngas cooler 154. The syngas then exits the syngas cooler 154 through the second outlet 208, and the slag is discarded via the third outlet 212. In this manner, the resultant fluid may come in contact with tubing of the syngas cooler 154 and fluid, such as water 226, flowing through the tubing may act to cool the resultant fluid as it travels through the syngas cooler 154. One result of this cooling process may be the generation of steam 228 in the tubing, which may then be transmitted to a high pressure drum for collection and transmission to the heat recovery steam generator 138 (see FIG. 1).

The syngas cooler 154 may also include a mechanism in a lower region of the syngas cooler 154 that may aid in directing the cooled syngas and slag out of the syngas cooler 154 through the respective outlets 208 and 212. For example, the slag 109 may be directed to flow in a generally downward direction 224 to exit the syngas cooler 154 via outlet 212. In contrast, the cooled syngas may be directed to flow toward the second outlet 208 and the second conduit 210. The slag exiting the third outlet 212 is directed toward the slag removal system 156 for processing. The slag first enters valve 168, which controls the amount of slag that is isolated and removed via lock hopper 172. The lock hopper 172 collects the incoming fluid and transfers it to valve 170 at a desired rate. The removed slag 109 may then be disposed of or used in a downstream application.

The resultant syngas exits the syngas cooler 154 via the second outlet 208. In some embodiments, the syngas may be further treated by the particulate removal system 106 after exiting the syngas cooler 154. That is, as before, the particulate removal system 106 may further react any organics and melt any residual inorganics left in the syngas via focused energy (e.g., plasma beams from plasma torches), as indicated by arrow 218. The untreated syngas may then enter the gas cleaning unit 110 for further processing. The water scrubber 174 removes the fines from the syngas producing scrubbed syngas 176, which may contain reduced amounts of contaminants as compared to the untreated syngas. The scrubbed syngas 176 may be used for gas-turbine fuel, chemicals manufacture, or the like. A discard stream exits the water scrubber 174. A first portion of the discard stream is disposed of as black water 180 through valve 178. A second portion of the discard stream is directed through recirculation loop 182 for further cleaning of the untreated syngas in the water scrubber 174.

Figure 3:
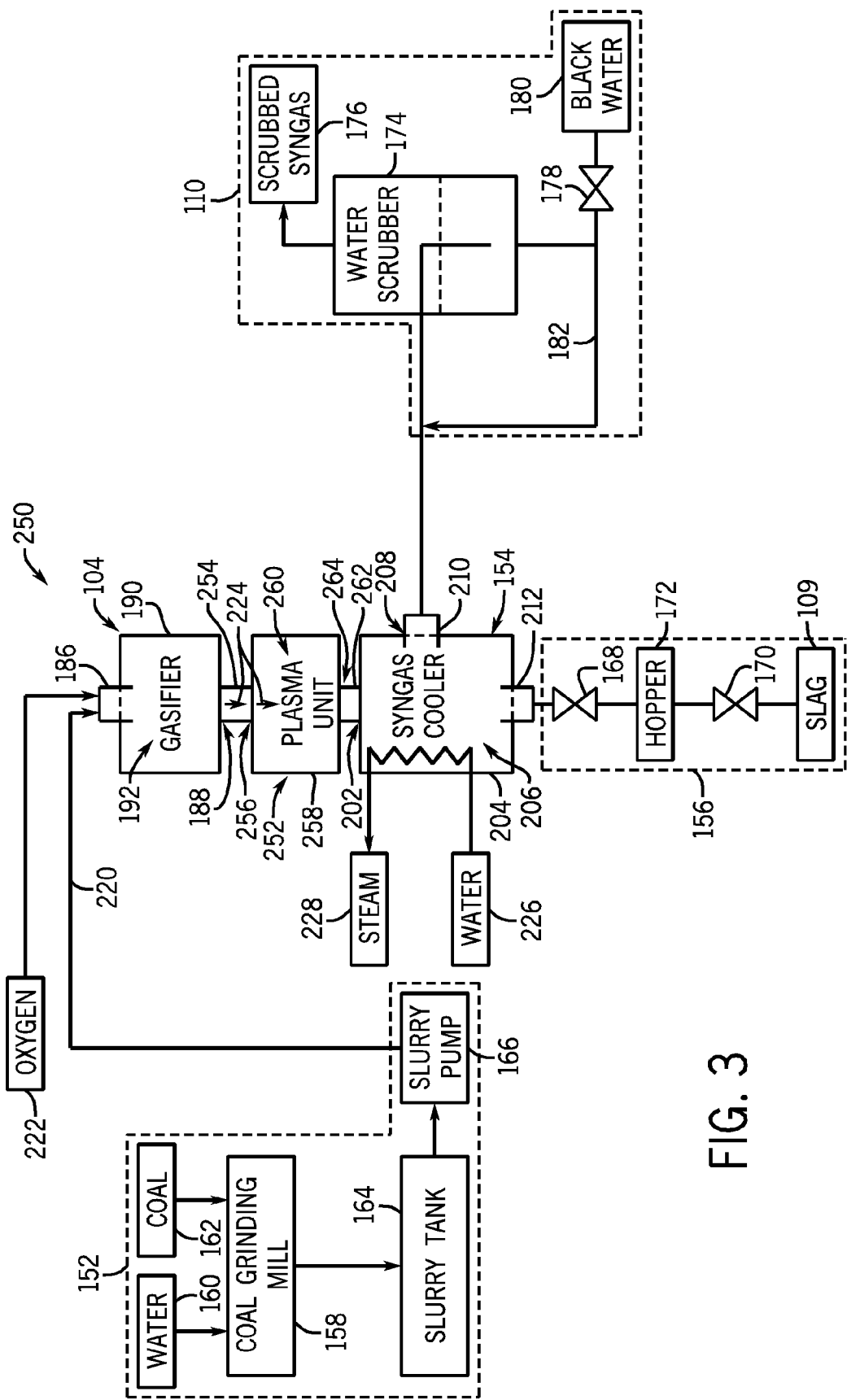
FIG. 3 is a block diagram of an embodiment of a gasification system as illustrated in FIG. 1, including a plasma gasifier downstream of a non-plasma based gasifier.
Figure 4:
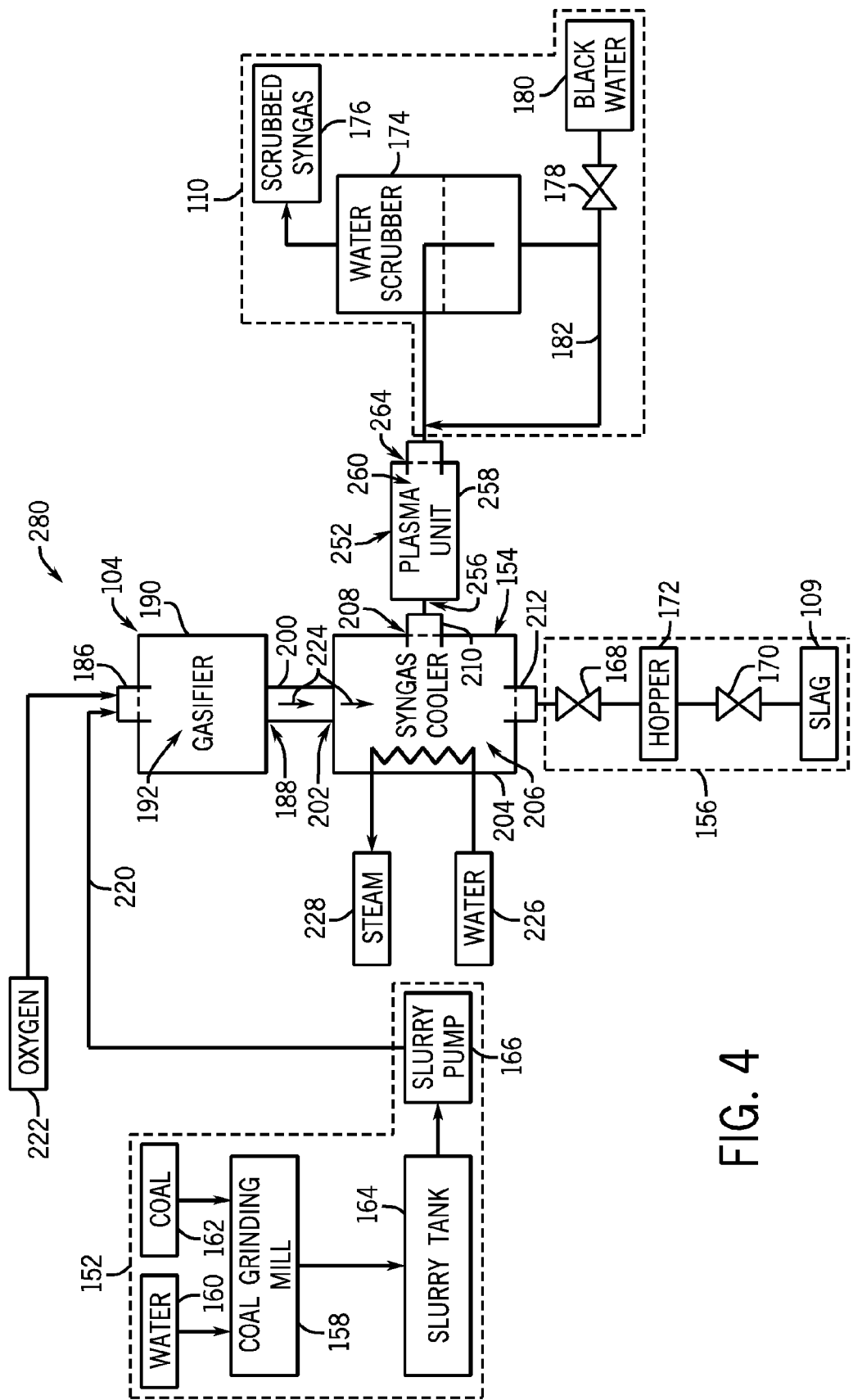
FIG. 4 is a block diagram of an embodiment of a gasification system as illustrated in FIG. 1, including a plasma gasifier downstream of a syngas cooler.
Figure 5:
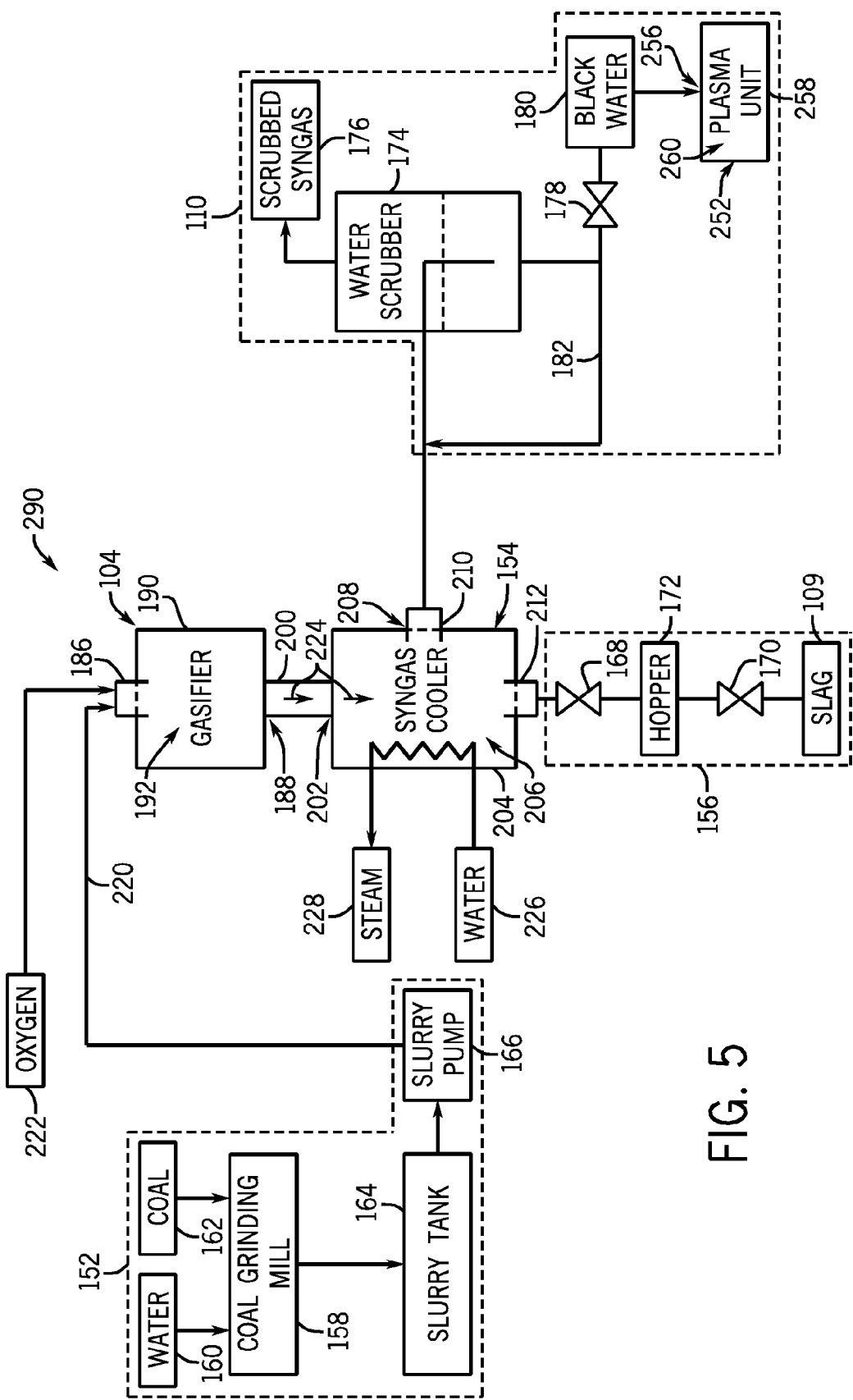
FIG. 5 is a block diagram of an embodiment of a gasification system as illustrated in FIG. 1, including a plasma gasifier downstream of a gas cleaning unit.

FIGS. 3-5 are block diagrams of various embodiments of gasification systems, wherein a focused energy system (e.g., the plasma torch system 108) may be disposed within one or more focused energy gasifiers (e.g., plasma gasifiers). Specifically, FIG. 3 illustrates a gasification system or process 250 that includes the feedstock preparation system or process 152, the gasifier 104, a plasma unit 252, the syngas cooler 154, the fines or slag removal system or process 156, and the gas cleaning unit 110. As before, the gasifier 104 includes the first inlet 186, the first outlet 188, and the enclosure 190 that defines the first interior volume 192. However, in this embodiment, the first outlet 188 of the gasifier 104 opens into conduit 254, which couples the outlet 188 of the gasifier 104 to a third inlet 256 of the plasma unit 252. An enclosure 258 defines a third interior volume 260 of the plasma unit 252. A conduit 262 couples a fourth outlet 264 of the plasma unit 252 to the second inlet 202 of the syngas cooler 154. As before, the enclosure 204 defines the second interior volume 206 of the syngas cooler 154, the second outlet 208 couples the syngas cooler 154 to the second conduit 210, and the third outlet 212 couples the syngas cooler 154 to the fines or slag removal system 156.

As described in detail above, during operation, the feedstock preparation system 152 prepares a slurry feed of coal that is approximately 50 to 70 wt % in water. That is, the slurry pump 166 accesses the slurry feed in the slurry tank 164 and transfers an amount suitable for use in the gasification process 150 to the gasifier 104 via conduit 220. The slurry feed and oxygen 222 are supplied to the gasifier 104 via the first inlet 186 located in a top of the gasifier 104. Reactants and slag flow in a generally downstream direction from the first inlet 186 of the gasifier 104 to the first outlet 188 of the gasifier 104. The gasifier 104 utilizes steam and oxygen to enable some of the slurry feed to be burned to produce carbon monoxide and release energy. A subsequent reaction converts further feedstock to hydrogen and additional carbon dioxide via a non-plasma gasification mechanism. In this way, the gasifier 104 manufactures a resultant gas and generates waste (e.g., slag).

The syngas and slag generated in the gasifier 104 may generally flow in a downward manner (e.g., downstream direction) from the outlet 188 of the gasifier 104, through the conduit 254, and into the plasma unit 252 via the inlet 256. After entering the plasma unit 252, the resultant fluid (e.g., syngas and slag mixture) flows through a passage of the plasma unit 252 that extends in flow direction 224 lengthwise through the third interior volume 260. In the embodiment illustrated in FIG. 3, the plasma unit 252 includes the focused energy system (e.g., the plasma torch system 108). In such embodiments, the plasma unit 252 may include one or more focused energy devices (e.g., plasma torches) configured to remove particulate matter from the fluid downstream of the gasifier 104. In some embodiments, the plasma unit 252 may be a plasma treatment unit, such as a plasma gasifier. The focused energy devices (e.g., plasma torches) in the plasma unit 252 may melt inorganic particulate and react organic particulate in the resultant fluid that is manufactured by the gasifier 104. Accordingly, the particulate removal system 106 is configured to exclusively gasify the fines that emerge as products of the primary gasification process. As such, organic particulate that remains unreacted after the non-plasma based gasification mechanism in the gasifier 104 may still be reacted downstream of the gasifier 104 in the plasma unit 252. In some embodiments, the non-plasma based gasification mechanism may include an entrained flow, fixed bed, fluidized bed, bubbling bed, or circulating fluidized bed.

The plasma torches located in the plasma unit 252 may be arranged in any manner suitable for treatment of the fluid stream produced by the gasifier 104. For instance, one or more plasma torches may be coupled to the enclosure 258 in a variety of arrangements. In certain embodiments, the plasma torches may be circumferentially disposed about the inner wall of the enclosure 258 and directed toward one another to generally converge the emerging plasma streams. In another embodiment, the plasma torches may be positioned at varying angles around the inner walls of the enclosure 258 such that subsets of the plasma streams are configured to converge (e.g., multiple sets of 2, 3, 4, 5, or more plasma torches may be positioned such that each set of torches has converging plasma streams). In further embodiments, one or more plasma torches may be configured to direct plasma streams in the upstream, the downstream direction, or both, relative to the flow lengthwise through the third interior volume 260 of the plasma unit 252. In fact, in presently contemplated embodiments, one or more plasma torches may be arranged in any manner within the plasma unit 252.

The plasma treated fluid (e.g., syngas and slag) exiting the plasma unit 252 via outlet 264 may generally flow in a downward manner (e.g., downstream direction) through conduit 262 and into the syngas cooler 154 via the second inlet 202. The resultant fluid enters the syngas cooler 154 through the second inlet 202 and flows lengthwise through the syngas cooler 154 where the plasma treated fluid is cooled. The syngas then exits the syngas cooler 154 through the second outlet 208, and the slag is discarded via the third outlet 212 as described above. The slag exiting the third outlet 212 is directed toward the slag removal system 156 for disposal or use in a downstream application. The untreated syngas may then enter the gas cleaning unit 110 for further processing. As before, the gas cleaning unit 110 generates scrubbed syngas 176 that may be used for gas-turbine fuel, chemicals manufacture, or the like.

FIG. 4 is a block diagram of an embodiment of a gasification system or process 280 that includes the feedstock preparation system or process 152, the gasifier 104, the syngas cooler 154, the fines or slag removal system or process 156, the plasma unit 252, and the gas cleaning unit 110. In contrast to FIG. 3, the plasma unit 252 is located after the syngas cooler 154 in the fluid flow path through the gasification process 280. That is, in this embodiment, the feedstock preparation unit 152 prepares a slurry feed, which is fed to the gasifier 104 with the oxygen 222 for a primary gasification process (e.g., non-plasma based gasification). However, the resultant fluid emerging from the gasifier 104 does not immediately enter the plasma unit 252 as in FIG. 3, but instead enters the syngas cooler 154 via conduit 200. The resultant fluid is then cooled in the syngas cooler 154 and separated into slag 109 and untreated syngas. The untreated syngas exits the syngas cooler 154 via outlet 208 and enters the plasma unit 252 via inlet 256. That is, in this embodiment, only the untreated syngas without slag 109 enters the plasma unit 252. The plasma unit 252 may include one or more focused energy devices (e.g., plasma torches) configured to remove particulate matter from the untreated syngas after cooling and slag removal. The focused energy devices in the plasma unit 252 may melt inorganic particulate and react organic particulate that remains in the untreated syngas. The high energy (e.g. plasma) treated untreated syngas exiting the plasma unit 252 via outlet 264 enters the gas cleaning unit 110, which generates the scrubbed syngas 176.

FIG. 5 is a block diagram of another embodiment of a gasification system or process 290 having the plasma unit 252 downstream from the gasifier 104. In this embodiment, the gasification system 290 includes the feedstock preparation system or process 152, the gasifier 104, the syngas cooler 154, the fines or slag removal system or process 156, and the gas cleaning unit 110. However, in contrast to the embodiments of FIGS. 2-4, the plasma unit 252 is located in, or associated with, the gas cleaning unit 110. Accordingly, the untreated syngas emerging from the outlet 208 of the syngas cooler 154 is transferred to the gas cleaning unit 110. As before, the untreated syngas is transferred to the water scrubber 174, which removes the fines, thereby producing scrubbed syngas 176. In certain embodiments, the removed fines may be used in the plasma unit 252 to melt inorganic particulates and react organic particulate in the removed fines (e.g., a filter cake), as discussed in further detail below. The scrubbed syngas 176 may be used for gas-turbine fuel, chemicals manufacture, or the like. A discard stream exits the water scrubber 174. A portion of the discard stream is directed through recirculation loop 182 for further cleaning in the water scrubber 174. Another portion of the discard stream is disposed of as black water 180 through valve 178.

In the embodiment illustrated in FIG. 5, the plasma unit 252 may be configured to receive the black water 180 through inlet 256 and treat the black water 180 via plasma based gasification and/or the plasma unit 252 may be configured to receive a filter cake (e.g., fines filtered out of the black water) through inlet 256 and melt and/or react the filter cake via one or more streams or sheets of plasma. That is, in presently contemplated embodiments, the particulate removal system 106 (e.g., plasma unit 252) may be coupled to a wastewater conduit or a wastewater treatment unit, or the system 106 may be coupled to a removed particulate conduit or delivery system. Plasma treatment of the black water 180 may cause any organic particulate in the black water to react to form a byproduct gas. The byproduct gas may be captured, cooled, and cleaned for subsequent use or disposal. Additionally, any inorganic particulate in the black water 180 may melt and form a liquid silicate at the bottom of the plasma unit 252. The liquid silicate may be transferred from the plasma unit 252 to a water quench where it is condensed into a solid silicate for disposal. Likewise, the plasma treatment of the filter cake may also produce the byproduct gas from any unreacted carbon that may remain in the filter cake.

It should be noted that the plasma unit 252 illustrated herein may be any type of gasifier suitable for use in the illustrated gasification systems. For instance, suitable gasifiers may be capable of using plasma to gasify a feed in an oxygen starved environment and capable of operating at a slightly negative pressure. For further example, in some embodiments, the plasma unit 252 may be a fixed bed gasifier. In such embodiments, plasma gasification may occur at temperatures of approximately 2000° C. to 5000° C., and the byproduct gas may exit the plasma unit 252 at temperatures of approximately 700° C. to 1500° C. For further example, the plasma unit 252 may be a fluidized bed gasifier. In these embodiments, the plasma reaction zone may have temperatures of less than approximately 2000° C. to 5000° C.

Figure 6:
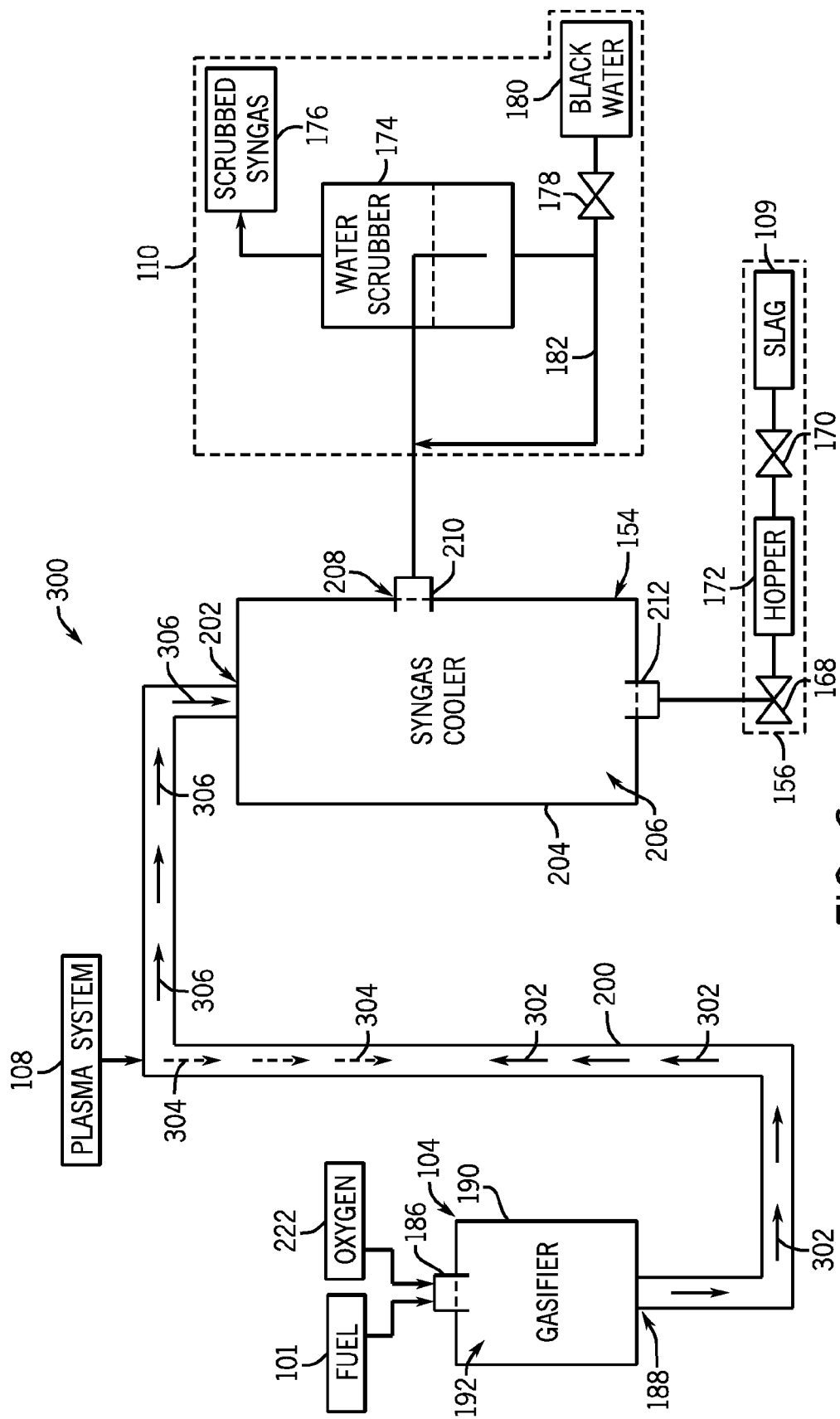
FIG. 6 is a block diagram of an embodiment of a gasification system as illustrated in FIG. 1, including a plasma system disposed along a conduit coupling a gasifier to a syngas cooler.

FIG. 6 is a block diagram of a gasification system or process 300 illustrating an exemplary plasma system 108. The gasification system 300 includes the gasifier 104 configured to receive fuel 101 and oxygen 222, conduit 200, the plasma system 108, the syngas cooler 154, the fines or slag removal system 156, and the gas cleaning unit 110. During operation, the fuel 101 and oxygen 222 enter the gasifier 104 via inlet 186. The gasifier 104 utilizes the oxygen to convert the fuel into a resultant gas and waste (e.g., slag) via non-plasma based gasification. The resultant fluid (e.g., gas and waste) exits the gasifier 104 via outlet 188 and enters conduit 200. The resultant fluid travels in a downstream direction along the path indicated by arrows 302 through the conduit 200. The focused energy system (e.g., the plasma system 108) is configured to direct a focused energy stream (e.g., plasma stream) in an upstream direction along a longitudinal axis of the conduit 200, as indicated by arrows 304. In this way, the upstream direction of the focused energy stream (e.g., plasma stream 304) opposes the downstream direction of the fluid flow 302, such that the fluid stream 302 converges with the plasma stream 304 in the conduit 200. That is, the plasma system 108 is positioned to direct the plasma stream 304 in a first direction that is generally opposite the second direction of the fluid flow 302. For example, in the illustrated embodiment, an angle between the first direction and the second direction is approximately 180 degrees. In further embodiments, the first and second directions may be oriented at an angle of less than approximately 5, 10, 15, 20, 30, or 40 degrees relative to one another. For example, the first direction maybe located along the longitudinal axis, and the second direction may be located at a 10 degree angle from the longitudinal axis. For further example, the first direction may be located at a 5 degree angle from the longitudinal axis, and the second direction may be located at a 10 degree angle from the longitudinal axis. Accordingly, in such embodiments, the plasma stream 304 interacts with the fluid stream 302, reacting organic particulate and melting inorganic particulate contained in the fluid stream 302.

After interacting with the plasma stream 304, the plasma treated fluid 306 enters the syngas cooler 154 through the second inlet 202 and flows lengthwise through the syngas cooler 154 where the plasma treated fluid is cooled. The syngas then exits the syngas cooler 154 through the second outlet 208, and the slag is discarded via the third outlet 212 as described above. The slag exiting the third outlet 212 is directed toward the slag removal system 156 for disposal or use in a downstream application. The untreated syngas may then enter the gas cleaning unit 110 for further processing. As before, the gas cleaning unit 110 generates scrubbed syngas 176 that may be used for gas-turbine fuel, chemicals manufacture, or the like.

Figure 7:
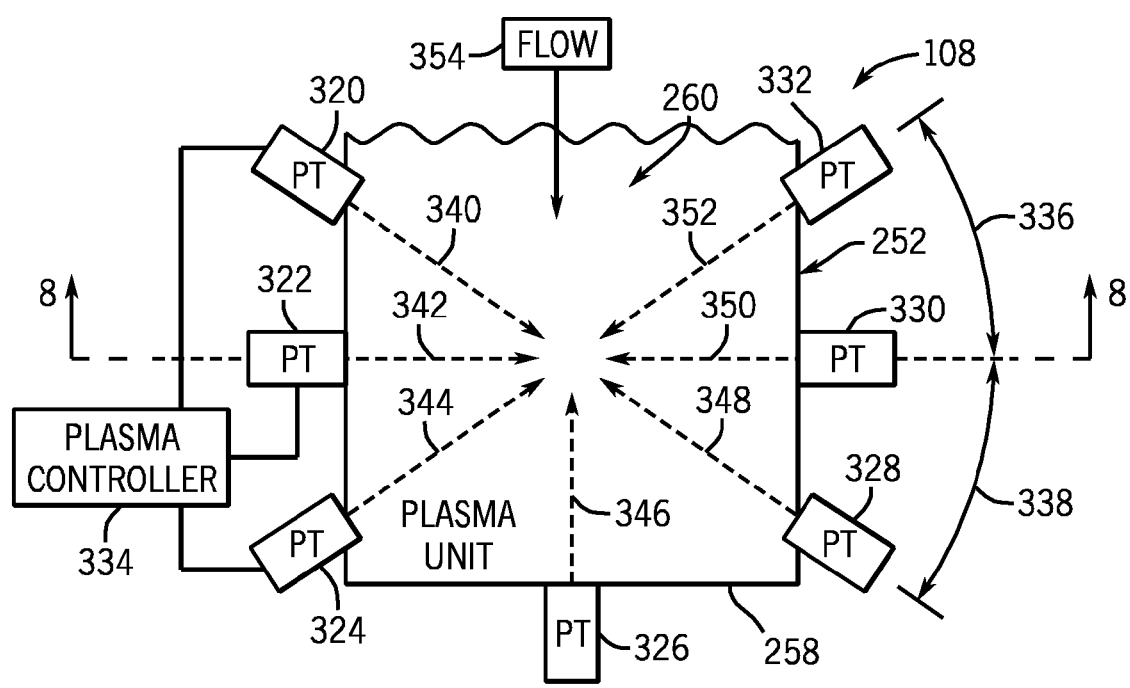
FIG. 7 is a cross-sectional side view of an embodiment of a plasma gasifier including a plurality of converging plasma streams.

FIG. 7 is a cross-sectional side view of a bottom section (e.g., downstream portion) of an exemplary plasma unit 252. In the illustrated embodiment, the plasma torch system 108 includes the plasma unit 252, a plurality of plasma torches 320, 322, 324, 326, 328, 330, and 332, and a plasma controller 334. The plurality of plasma torches is disposed about the wall of the enclosure 258 at different axial, radial, and/or circumferential positions. For example, plasma torches 320 and 332 are disposed at a first axial position, torches 322 and 330 are disposed at a second axial position, torches 324 and 328 are disposed at a third axial position, and torch 326 is disposed at a fourth axial position (e.g., bottom) of the plasma unit 252. Furthermore, plasma torch 332 is disposed at a first angle 336 relative to plasma torch 330, and plasma torch 328 is disposed at a second angle 338 relative to plasma torch 330. Likewise, plasma torch 320 is also disposed at the first angle 336 relative to plasma torch 322, and plasma torch 324 is disposed at the second angle 338 relative to plasma torch 322. In the illustrated embodiment, the plasma torches 322 and 330 are disposed in a horizontal plane crosswise (e.g., perpendicular) to a longitudinal axis of the plasma unit 252 (e.g., perpendicular to fluid flow). Thus, the first angle 336 is directed downstream, while the second angle 338 is directed upstream. The first and second angles 336 and 338 may range between approximately 1 to 90 degrees, 5 to 80 degrees, 10 to 70 degrees, 20 to 60 degrees, 30 to 50 degrees, or about 45 degrees. Moreover, the first and second angles 336 and 338 may be the same or different from one another. In still further embodiments, the first angle 336 and the second angle 338 may be variable during operation. That is, during operation, the angle of each of the plasma torches may change to accommodate changes in operating conditions, performance characteristics, and so forth. For example, in one embodiment, the first angle 336 may be varied such that plasma torch 332 directs stream 352 at an angle perpendicular to flow 354. The plasma torch 326 opposes fluid flow 354.

The foregoing positioning of the plasma torches may have the effect of converging a plurality of plasma streams 340, 342, 344, 346, 348, 350, and 352 toward one another at a central region in the plasma unit 252. That is, the plurality of plasma torches is positioned to direct the plurality of plasma streams toward one another. In the illustrated embodiment, seven plasma streams converge. However, in alternate embodiments, any number of plasma torches may be arranged such that any number of plasma streams converge. For example, the number of converging streams may be approximately 2 to 10, 5 to 20, or any other suitable number. For further example, the number of converging streams may be at least approximately 3, 4, or 5. It should also be noted that the plurality of plasma torches may have a variety of arrangements inside the enclosure 258. Although FIG. 7 illustrates only 7 plasma torches, the plasma torch system 108 may include any number of plasma torches, e.g., 1 to 10, 1 to 50, or 1 to 100. Moreover, the spacing between plasma torches may be selected based on characteristics of the plasma unit 252, e.g., size or capacity of the plasma unit 252. For example, the plasma torches may be uniformly or non-uniformly spaced within the enclosure 258. As illustrated, the plasma unit 252 supports the plasma torches in a uniform arrangement inside the enclosure 258. However, the distance between adjacent plasma torches may be equidistant or may vary between plasma torches. Furthermore, although the illustrated embodiment shows plasma torches in the plasma torch system 108, any suitable arrangement of any type of focused energy devices (e.g., plasma torches) may be employed in the focused energy system (e.g., plasma torch system 108).

During operation, fluid flow 354 is established in a generally downstream direction toward plasma torch 326 (e.g., opposite directions). As the fluid flow 354 travels lengthwise through the plasma unit 252, the plurality of plasma streams converge on the flow 354 and interact with the contents of the fluid. For example, the plasma energy may melt inorganic particulate contained in the fluid. For further example, the plasma energy may cause organic particulate, such as remnants from the non-plasma based gasification process, in the fluid to react. Again, the inclusion of such a plasma based gasification step may have the effect of increasing the carbon conversion efficiency of the overall gasification system, because carbonaceous material that remains unreacted after the non-plasma based gasification may still be reacted during the plasma based gasification.

In the illustrated embodiment, the plasma controller 334 is configured to independently control the plasma streams associated with the plasma torches 320, 322, 324, 326, 328, 330, and 332. That is, the plasma controller 334 may control operational characteristics of the plurality of plasma torches in the plasma torch system 108 based on feedback from a sensor system, baseline parameters, preset limits, historical data, and so forth. For example, the plasma controller 334 may be configured to activate or deactivate each of the plurality of plasma torches based on characteristics of the flow 354 such as volume, flow rate, viscosity, or the like. The plasma controller 334 may also be configured to change the first angle 336 and/or the second angle 338 based on flow characteristics. For further example, the plasma controller 334 may operate in conjunction with a sensor system that measures characteristics of the flow 354 and may employ closed-loop control to vary the activity of the plasma torches in a uniform manner or a non-uniform manner depending on the received feedback. For instance, if the sensor system detects a reduction in the rate of the flow 354 through the plasma unit 252, the plasma controller 334 may deactivate one or more of the plasma torches to accommodate the decrease in fluid. Likewise, if the rate of the flow 354 has increased, the plasma controller 334 may activate one or more of the plasma torches to accommodate the increased fluid load that must be treated by the plasma energy. For even further example, the plasma controller 334 may control operational characteristics such as the temperature, energy/volume, and so forth, of the plasma torches. In such embodiments, sensors may be employed that detect the amount of unreacted organic particulate in an exiting gas stream and adjust the operational characteristics accordingly. For instance, the plasma controller 334 may adjust angles 336 and/or 338 to facilitate better mixing by creating plasma plumes (e.g., large scale vortices).

Figure 8:
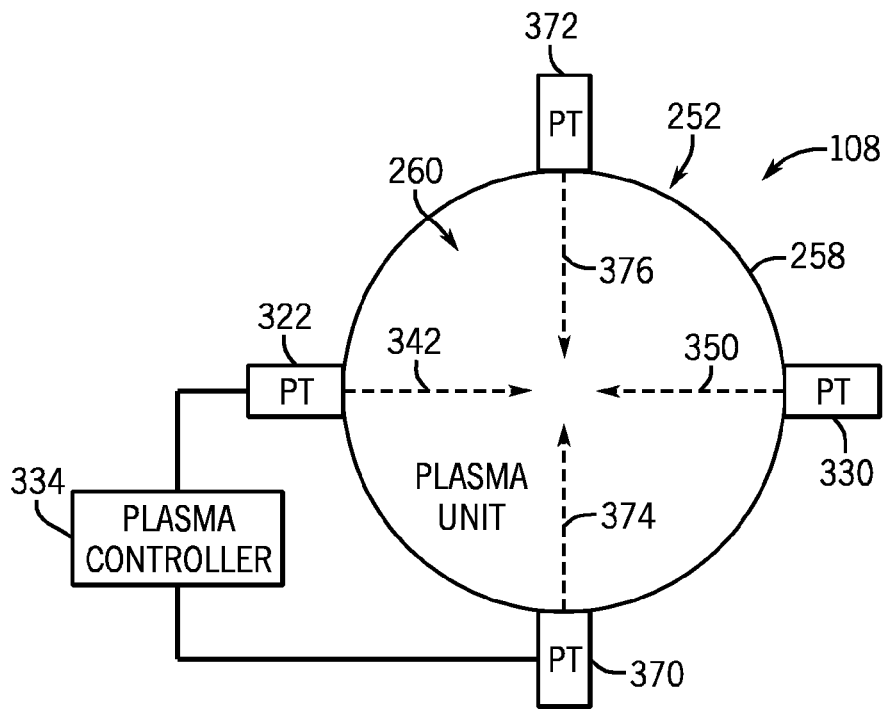
FIG. 8 is a cross-sectional view of an embodiment of a plasma gasifier taken along line 8-8 of FIG. 7, illustrating a plasma torch system with converging plasma streams.

FIG. 8 is a cross-sectional view of the plasma unit 252 taken along line 8-8 of FIG. 7, illustrating a single axial position within the plasma unit 252. As illustrated, the plasma unit 252 includes the plasma torch 322, the plasma torch 330, a plasma torch 370, and a plasma torch 372. That is, the plasma torches 322, 330, 370, and 372 are positioned at different locations around the circumference of the wall of the enclosure 258. This circumferential positioning of the plasma torches may have the effect of converging a plurality of plasma streams 342, 350, 374, and 376 toward one another at a central radial region in the plasma unit 252. In the illustrated embodiment, four plasma streams converge. However, in alternate embodiments, any number of plasma torches may be arranged such that any number of plasma streams may converge. For example, the number of converging streams may be at least approximately 3, 4, or 5. It should also be noted that the plurality of plasma torches may have a variety of arrangements at any radial position inside the enclosure 258. Although FIG. 8 illustrates only four plasma torches, the plasma torch system 108 may include any number of plasma torches, e.g., 1 to 10, 1 to 50, or 1 to 100 disposed at any one axial position. Additionally, the plasma torches may be uniformly or non-uniformly spaced about the circumference of the enclosure 258. That is, the distance between adjacent plasma torches may be equidistant or may vary between plasma torches. Any suitable arrangement of the plasma torches may be employed at any axial position in the plasma torch system 108. Furthermore, although the illustrated embodiment shows plasma torches in the plasma torch system 108, any suitable arrangement of any type of focused energy devices may be employed in the focused energy system.

Figure 9:
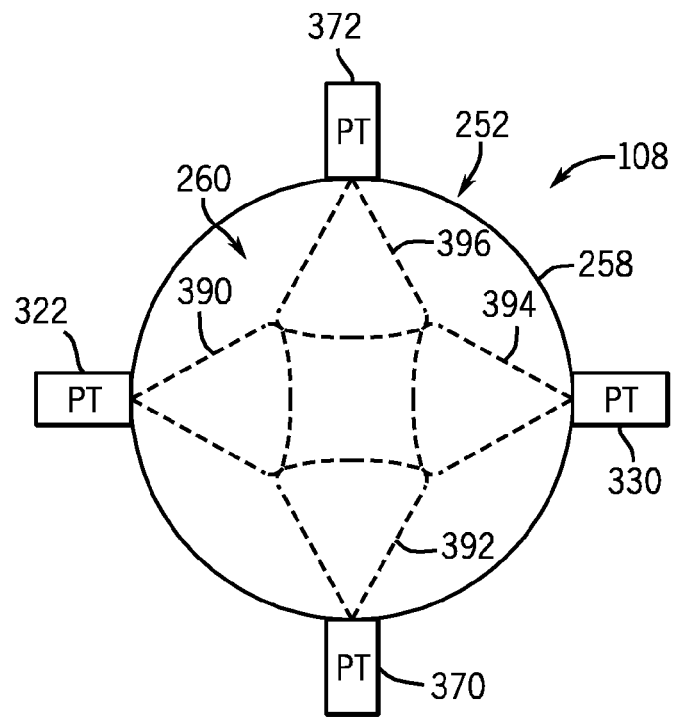
FIG. 9 is a cross-sectional view of an embodiment of a plasma gasifier taken along line 8-8 of FIG. 7, illustrating a plasma torch system with converging plasma sheets.

FIG. 9 is a cross-sectional view of an alternate exemplary embodiment of the plasma unit 252 taken along line 8-8 of FIG. 7. In this embodiment, the plurality of plasma torches 322, 330, 370, and 372 are configured to generate a plurality of plasma sheets 390, 392, 394, and 396. That is, plasma torch 322 generates plasma sheet 390 that diverges outward from plasma torch 322 into inner chamber 260 during operation. Similarly, plasma torch 370 generates plasma sheet 392 that diverges outward from torch 370, plasma torch 330 generates plasma sheet 394 that diverges outward from torch 330, and plasma torch 372 generates plasma sheet 396 that diverges outward from torch 372. These plasma sheets 390, 392, 394, and 396 may be in a common plane to increase coverage inside the plasma unit 252, thereby reacting more fluid/particulate in the flow. The foregoing feature may have the effect of converging the plasma sheets at a central region within chamber 260. The plasma energy contained in such sheets interacts with particulate contained in a fluid flow through the plasma unit 252. That is, as before, the plasma sheets 390, 392, 392, and 396 are configured to melt inorganic particulate and react organic particulate in the fluid flow. As before, although the illustrated embodiment shows plasma torches in the plasma unit 252, any suitable arrangement of any type of focused energy devices may be employed in the focused energy system.

In certain embodiments, a fines treatment system utilizing the above described plasma gasifier may be used to treat a waste stream produced from the gasification of the first fuel feedstock. Referring now to FIG. 10, an example of the IGCC system 100 including the fines treatment system is depicted. The gasification system 100 includes the gasifier 104 that may receive fuel 101 (e.g. the first fuel feedstock) through the feedstock preparation unit 102, the gas cleaning unit 110, a black water handling system 402, a fines filter 404, and a fines treatment system 406. Although the fines treatment system 406 may be used with the IGCC system 100, the fines treatment system 406 also may be used in any of a variety of types of plants that use or produce syngas. For example, the fines treatment system 406 may be used in any plant that produces CO, hydrogen, methanol, ammonia, or any other chemical or fuel product as described above. Furthermore, the fines treatment system 406 may be used without power generation (e.g., generators) in some embodiments.

As described above with regard to FIG. 1, the solid fuel 101 may be passed to the feedstock preparation unit 102, gasified in the gasifier 104, followed by cleaning of the generated syngas in the gas cleaning unit 110 to produce a treated syngas. The waste stream produced in the gas cleaning unit 110 is transferred to the black water handling unit 402 and filtered through the fines filter 404 to separate the fines from the black water 436 to produce gray water 438. In certain embodiments, the fines filter may capture approximately 90-100% of the fine particles where approximately 20-60% of the fines are less than 50 microns. Accordingly, the fines forms a filter cake 405 containing approximately 20-60% water and 40-80% solid material. The resultant filter cake 405 may have a significant amount of unreacted carbon that may be converted into a second syngas 409 via the fines treatment system 406 (e.g., using one or more high energy streams or sheets such as plasma in a focused energy system 408). In turn, the syngas 409 may be used to power a power-generating device 410, such as a combustion system, engine, turbine, or the like. The second syngas may have a different composition compared to the syngas produced from the gasification of the first fuel feedstock in gasifier 104. This may be caused by the increased amount of inorganic material in the filter cake 405 compared to the first fuel feedstock. In another embodiment, the waste steam may include waste from an adjacent plant and/or biomass waste, such as wood or yard waste, or any combustible material containing no sulfur, or a combination thereof. It should be noted that the gasification of the filter cake 405 in the fines treatment system 406 also produces slag 412 that may be combined with slag 109, produced in the gasifier 104, in a slag treatment unit 416. As discussed above, the slag 109 and 412 may be disposed of and used, for example, as road base or building material. In further embodiments, a controller 420 may be coupled to the gasifier 104 and the fines treatment system 406 to independently and simultaneously control the gasifier 104 and the fines treatment system 406, as described in detail below.

The fines treatment system 406 includes the focused energy system 408 (e.g., a plasma torch system). FIG. 11 is a block diagram of a region 430 of the IGCC system 100 including the fines treatment unit 406 having the focused energy system 408. The region 430 may be located downstream of the gas cleaning unit 110 such that the fines treatment system 406 may receive the waste stream through an inlet valve 432. In one embodiment, the focused energy system 408 of the fines treatment system 406 includes a plasma gasifier 440 having a plasma torch system 442. The plasma torch system 442 may provide a focused beam of high energy (e.g., a plasma stream and/or sheet) to melt inorganic components and react organic components present in a filter cake 405. The filter cake 405 may include fines or soot from the gasification of the feedstock. In certain embodiments, the plasma torch system 442 may include one or more plasma torches 443 that generate plasma 445 suitable for the gasification process. For example, the plasma torches 443 may include two electrodes for receiving electricity and generating an arc. The plasma torches 443 may maintain internal temperatures of up to approximately 5000° C. as inert gas (e.g., nitrogen, argon, etc.) is passed through the arc. For example, the internal temperatures in the plasma torches 443 may be at least greater than approximately 2000° C., 3000° C., 4000° C., or 5000° C.

The plasma gasifier 440 illustrated herein may be any type of gasifier suitable for use in the illustrated gasification system, and the plasma gasifier 440 may have an interior volume of at least less than approximately 2.5%, 5%, 7.5%, 10%, 12.5%, or 15% of the interior volume of the gasifier 104. In one embodiment, the plasma gasifier 440 may be a fixed bed gasifier. Accordingly, gasification may occur at temperatures between approximately 2000° to 5000° C. In another embodiment, the plasma gasifier 440 may be a gasifier that may gasify the unreacted carbon in the filter cake 405 in an oxygen-starved environment and may operate at a slightly negative pressure. In a further embodiment, the plasma gasifier 440 may include a fluidized bed gasifier. As such, the gasification of the filter cake 405 may occur at temperatures less than approximately 2000° C. to 5000° C.

After gasification of the filter cake 405 in the plasma gasifier 440, the resultant second syngas 409 exits through an outlet valve 434 as a second untreated syngas 409, which may be maintained at low pressure (e.g., ambient pressure), and treated in a syngas treatment unit 448 to remove any undesirable materials generated during the gasification to produce a low pressure second treated syngas 450. In one embodiment, the syngas treatment unit 448 may include a scrubber, such as, but not limited to, a sulfur scrubbing unit. In another embodiment, the syngas treatment unit 448 may employ a liquid phase oxidation process, such as LO-CAT® liquid redox available from Gas Technology Products LLC Corporation of Houston, Tex., to remove sulfur from the untreated syngas. The second treated syngas 450 may be used to power the power-generating device 410, which may include a gas turbine, an internal combustion engine with reciprocating pistons, or another gas powered engine. For example, in one embodiment, the power-generating device 410 may be a Jenbacher reciprocating gas engine, or other types of engines offered by General Electric Company of Schenectady, N.Y. The Jenbacher engine (or other device 410) is suitable for combusting low pressure (e.g., ambient pressure) fuel such as the syngas that may be produced from the plasma gasifier 440. For example, the engine may include an internal combustion engine with 1 to 30, 4 to 20, or 8 to 16 cylinders and associated reciprocating pistons. In another embodiment, the power-generating device 410 may be a steam generator. In a further embodiment, the second treated syngas may be combined with the syngas produced from the first fuel feedstock in gasifier 104. The second treated syngas 450 may or may not be compressed, depending on how it is used.

In one embodiment of the present disclosure, the controller 420 may use information provided via input signals 462 to execute instructions or code contained on a machine-readable or computer-readable storage medium and generate one or more output signals 460 to various control devices, such as control valves or pumps. For example, based on the execution of the instructions or code contained on the machine-readable or computer-readable storage medium of the controller 420, the output signals 460 may be used to control the gasification of the first fuel feedstock 102 and the waste stream (e.g., filter cake 405). In particular, the executed instructions may indicate to gasify the first fuel feedstock 102, purify the syngas, filter the waste stream (e.g., black water 436), and treat the filter cake 405 in the plasma gasifier 440 to generate the second syngas 409. In certain embodiments, a temperature sensor 452 and/or a pressure transducer 456 may send input signals 462 to the controller 420 indicating the temperature and/or pressure of the plasma gasifier 440, respectively. Accordingly, if the indicated temperature or pressure exceeds the limits of the plasma gasifier 440, the controller 420 may send the output signal 460 to shut off the plasma gasifier 440 or activate a safety release mechanism. In another embodiment, an operator may provide instructions to the controller 420 to run the IGCC system 100 in a mode such that the carbon conversion of the first fuel feedstock 102 in the gasifier 104 is reduced. For example, an oxygen limiting environment gasification of the first fuel feedstock 102 may result in an increased amount of unconverted carbon in the filter cake 446. The plasma gasifier 440 may gasify the unconverted carbon from the gasification of the first fuel feedstock 102 in the filter cake 446; hence, the carbon conversion efficiency of the IGCC system 100 may be maintained or maintained.

The technical effects of the invention include using the fines treatment system 406 that includes the focused energy system (e.g., plasma torch system 442) treating waste streams (e.g., filter cake 405) produced in the IGCC gasification system 100. The gasification waste streams contain a significant amount of unreacted carbon that may be converted into syngas. As such, the carbon conversion efficiency may increase, and the need to dispose of, or recycle, the resultant waste streams may be significantly reduced or eliminated. The generated syngas is cleaned in the syngas treatment unit 448 and used to power the power-generating device 410, such as the Jenbacher engine or the steam generator. Furthermore, implementation of the fines treatment system 406 allows an operator of the IGCC gasification system to run the plant in a mode where the carbon conversion is less in the gasifier 104, because the fines treatment system 406 may convert the remaining unreacted carbon.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gasifier comprising a first enclosure having a first inlet, a first outlet, and a first interior volume, wherein the first inlet is configured to receive a first fuel feedstock into the first interior volume, and the first outlet is configured to output a first syngas away from the first interior;
a separation device fluidly coupled to the first outlet and configured to receive the first syngas from the gasifier via the first outlet and to separate solid particulates from the first syngas to generate a black water source;
a plasma gasifier disposed downstream from and fluidly coupled to the separation device, wherein the plasma gasifier is configured to receive the solid particulates separated from the first syngas and produce a second syngas;
a filter unit disposed between the separation device and the plasma gasifier and configured to receive the black water, wherein the black water is filtered through the filter unit to generate a filter cake comprising the solid particulates separated from the first syngas; and
a controller programmed to control one or more components of the system, wherein the controller comprises instructions disposed on a non-transitionary, machine readable medium programmed to:
control gasification conditions of the gasifier; and
control treatment of the filter cake to produce the second syngas from unconverted carbon in the filter cake.

2. The system of claim 1, wherein the plasma gasifier comprises a second enclosure having a second inlet, a second outlet, and a second interior volume, wherein a plurality of plasma torches are coupled to the second enclosure.

3. The system of claim 2, wherein the second interior volume is at least less than approximately 5 percent of the first interior volume.

4. The system of claim 2, wherein the plurality of plasma torches are directed toward one another to generally converge plasma streams.

5. The system of claim 1, wherein the plasma gasifier comprises a second inlet fluidly coupled to the separation device, wherein the second inlet is configured to receive the solids particulates separated from the first syngas.

6. The system of claim 1, wherein the plasma gasifier is configured to transfer the second syngas through a second outlet.

7. The system of claim 1, comprising a power-generating device configured to receive the second syngas to produce power.

8. The system of claim 7, wherein the power-generating device comprises a gas turbine, a combustion engine, or a steam turbine.

9. The system of claim 1, wherein the separation device comprises a water scrubber.

\* \* \* \* \*